United States Patent
Robbins et al.

(10) Patent No.: US 8,742,612 B1
(45) Date of Patent: Jun. 3, 2014

(54) TURBINE HAVING COUNTER-ROTATING ARMATURE AND FIELD

(75) Inventors: Jon David Robbins, Overland Park, KS (US); Edward Glen Lindsey, Kansas City, KS (US)

(73) Assignee: Associated Energy Technology LLC, Kansas City, KS (US)

( * ) Notice: Subject to any disclaimer, the term of this patent is extended or adjusted under 35 U.S.C. 154(b) by 287 days.

(21) Appl. No.: 13/309,433

(22) Filed: Dec. 1, 2011

Related U.S. Application Data

(60) Provisional application No. 61/418,737, filed on Dec. 1, 2010.

(51) Int. Cl.
*F03D 9/00* (2006.01)
(52) U.S. Cl.
USPC ............................................. 290/55; 290/54
(58) Field of Classification Search
CPC .................................. F02K 3/072; F02C 3/107
USPC ....................................................... 290/54–55
See application file for complete search history.

(56) References Cited

U.S. PATENT DOCUMENTS

| | | | |
|---|---|---|---|
| 6,127,739 A * | 10/2000 | Appa | 290/55 |
| 6,492,743 B1 * | 12/2002 | Appa | 290/55 |
| 6,761,144 B2 * | 7/2004 | Schwam | 123/242 |
| 8,375,695 B2 * | 2/2013 | Schilling et al. | 60/39.162 |
| 2011/0049894 A1 * | 3/2011 | Green | 290/52 |
| 2012/0074712 A1 * | 3/2012 | Bursal | 290/55 |

* cited by examiner

*Primary Examiner* — Michael Zarroli
(74) *Attorney, Agent, or Firm* — Lathrop & Gage LLP

(57) ABSTRACT

In one embodiment, a turbine includes a first shaft rotatable in a first direction and a second shaft rotatable in a second direction; the second direction is generally opposite the first direction. A first propeller is coupled to the first shaft for rotating the first shaft in the first direction, and a second propeller is coupled to the second shaft for rotating the second shaft in the second direction. An armature is operatively coupled to the first shaft for rotation with the first shaft, and a field component is operatively coupled to the second shaft for rotation with the second shaft.

20 Claims, 2 Drawing Sheets

TURBINE HAVING COUNTER-ROTATING ARMATURE AND FIELD

CROSS-REFERENCE TO RELATED APPLICATIONS

This application claims priority to U.S. Provisional Patent Application No. 61/418,737, filed Dec. 1, 2010, which is incorporated herein by reference in its entirety.

TECHNICAL FIELD

The disclosed subject matter is directed to turbines.

BACKGROUND

Turbines traditionally have a stationary stator and a rotatable rotor assembly, which includes a shaft with blades attached. Moving fluid (either liquid or gas) acts on the blades, causing the rotor assembly to rotate relative to the stator. To generate electricity, either the stator or the rotor assembly includes a field component (e.g., a field winding or a field magnet) that creates a magnetic field. Whichever element (i.e., the stator or the rotor) does not include the field component includes an armature. An electromotive force is created by the rotation of the armature relative to the field.

SUMMARY

Turbines and systems for use in turbines are disclosed herein. In one embodiment, a turbine includes a first shaft rotatable in a first direction and a second shaft rotatable in a second direction; the second direction is generally opposite the first direction. A first propeller is coupled to the first shaft for rotating the first shaft in the first direction, and a second propeller is coupled to the second shaft for rotating the second shaft in the second direction. An armature is operatively coupled to the first shaft for rotation with the first shaft, and a field component is operatively coupled to the second shaft for rotation with the second shaft.

In another embodiment, a turbine includes a first shaft rotatable in a first direction and a second shaft rotatable in a second direction; the second direction is generally opposite the first direction. An armature is operatively coupled to the first shaft for rotation with the first shaft, and a field component is operatively coupled to the second shaft for rotation with the second shaft. Structure is included for rotating the first shaft in the first direction, and structure is included for rotating the second shaft in the second direction.

In still another embodiment, a turbine includes an armature and a field component each rotatable relative to the other in opposite directions. One shaft is operatively coupled to both: (a) the armature for rotating the armature; and (b) structure for transferring energy from a gas and/or a liquid. Structure is also included for rotating the field component opposite the armature.

DETAILED DESCRIPTION

Figure 1:
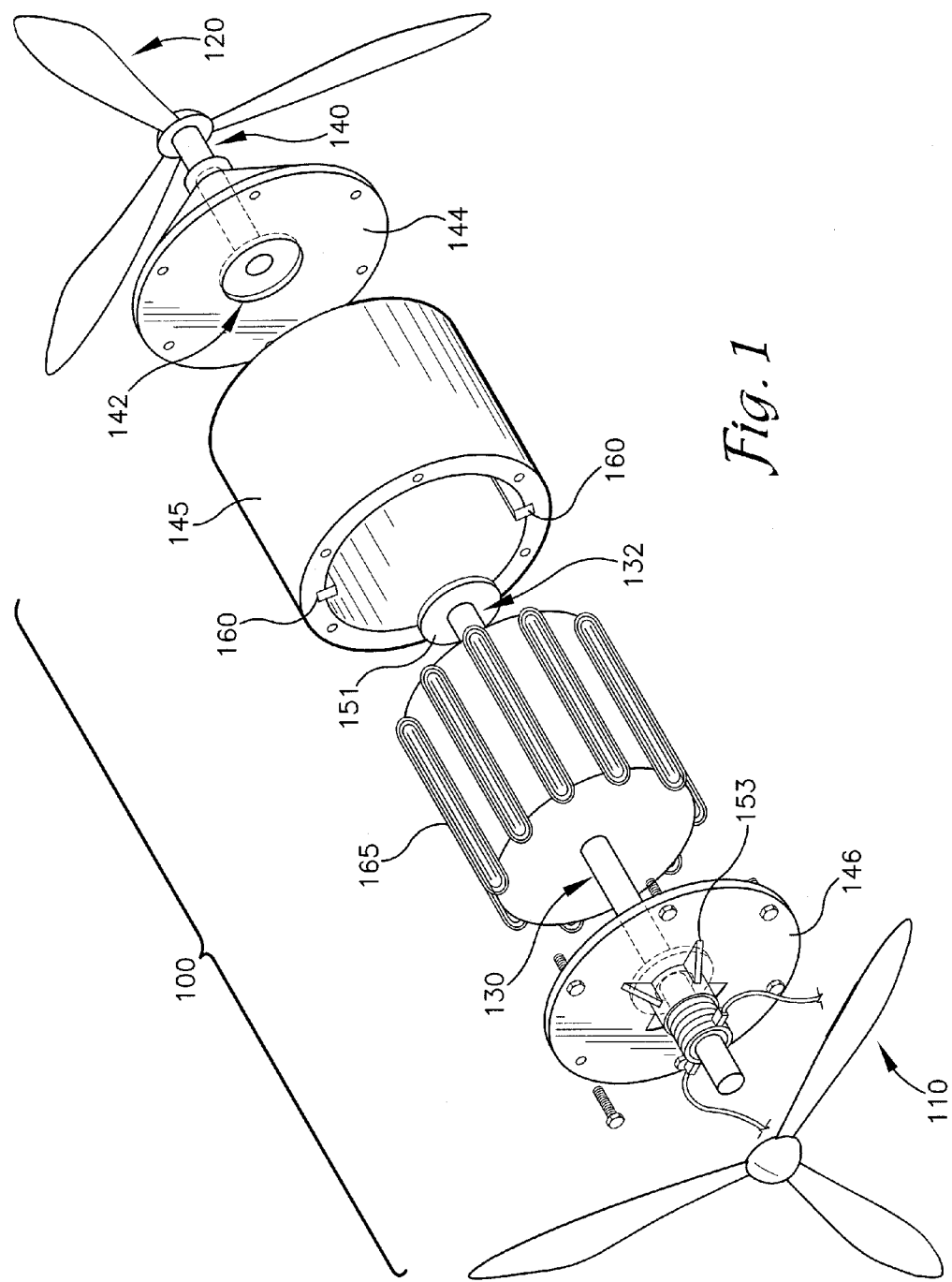
FIG. 1 is an exploded view of a turbine according to an embodiment.
Figure 2:
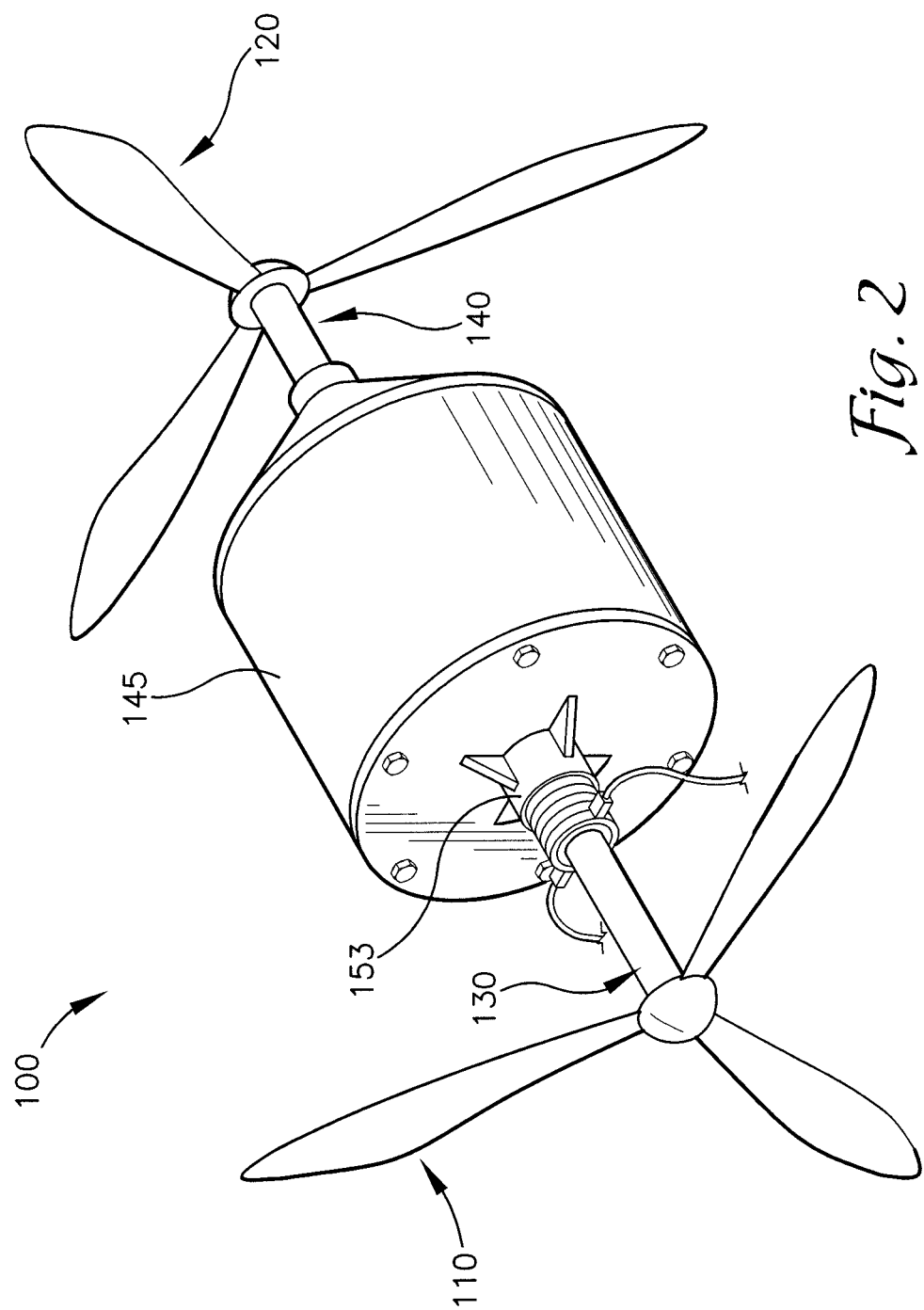
FIG. 2 is a perspective view of the turbine of FIG. 1.

FIGS. 1 and 2 show a turbine 100 according to one embodiment. The turbine 100 includes a pair of propellers 110, 120 configured to rotate in opposite directions. Any type of propeller, whether now known or later developed, may be incorporated as desired. Considerations in choosing propellers may include, for example, whether the turbine is going to operate with gas (e.g., wind, a heated exhaust stream, etc.) or fluid (e.g., water); the desired weight of the propellers; and the desired lifespan of the propellers. In some embodiments, the propellers 110, 120 are generally the same design and size as one another, though installed to rotate in opposite directions. In other embodiments, the propellers 110, 120 may differ from one another. For example, the propeller 120 may be slightly larger than the propeller 110.

Each propeller 110, 120 is fixed to a respective rotatable shaft 130, 140, and the first and second rotatable shafts 130, 140 are configured to rotate in opposite directions from one another. It may be desirable for the shafts 130, 140 to lie along and rotate about a common axis. The shafts 130, 140 may be generally cylindrical (as shown), or may have any other acceptable shape (e.g., square tubing, octagonal tubing, et cetera). While substantially rigid shafts 130, 140 are currently preferred, it may be acceptable to alternately use flexible shafts 130, 140.

As shown in FIG. 1, the second shaft 140 may end at a collar 142, and a bearing 151 may be seated in the collar 142 to support end 132 of the first shaft 130. A flange plate 144 may extend from the second shaft 140 (e.g., at the collar 142), and a housing 145 may extend from the flange plate 144.

A field component 160 (e.g., a field winding, at least one field magnet, etc.) is embedded in or operatively coupled to the housing 145, and an armature 165 is operatively coupled to the first shaft 130 inside the housing 145. Those skilled in the art will appreciate that the field component 160 may alternately be located inside the housing 145, with the armature 165 embedded in or operatively coupled to the housing 145. Further, field components, armatures, and the output of electrical current are well known in the art so long as either the field components or the armature is stationary; any such known elements may be used with the teachings of the current invention.

A cover plate 146 may be attached to the housing 145, and a bearing 153 may provide support between the cover plate 146 and the first shaft 130. Additional bearings (not shown) may provide further support to the first shaft 130 and/or the second shaft 140.

For purposes of illustration, the propeller 110 shall be described as a front propeller, and the propeller 120 shall be described as a rear propeller. In use, the propellers 110, 120 may be positioned such that fluid moves generally parallel to the shafts 130, 140 and imparts force on the propellers 110, 120. Specifically, the fluid causes the front propeller 110 (and, via the first shaft 130, the armature 165) to rotate in one direction, and the fluid continues to the rear propeller 120; interaction with the fluid causes the rear propeller 120 (and, via the second shaft 140 and the housing 145, the field component 160) to rotate in an opposite direction. Because of the two propellers 110, 120 rotating in opposite directions, torque on the turbine 100 may be reduced relative to systems with only a single propeller. This reduced torque may allow a less costly support structure to be used with the turbine 100 relative to traditional systems having only a single propeller.

In addition, and very importantly, because electrical output is related to the speed at which the armature 165 rotates relative to the field component 160, more electricity may be output by the turbine 100 relative to prior art systems having a stationary armature or field when each system operates with identical incoming fluids. This is true because the rotation of both the field component 160 and the armature 165 (in opposite directions) increases the relative speed between the field component 160 and the armature 165 in the turbine 100. Similarly, the turbine 100 may output the same amount of electricity as prior art systems having a stationary armature or field when the turbine 100 operates with fluid moving slower than fluid operating the prior art systems.

In another embodiment (not shown), a single rotating shaft may be used instead of the dual shafts described above. With a single rotating shaft, gearing may be incorporated to replace the second shaft. For example, the propeller 120 and the shaft 140 may be omitted from embodiment 100, and gearing operatively associated with the shaft 130 may rotate the housing 145 (and the field component 160) opposite the armature 165.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

We claim:

1. A turbine, comprising:
   a first shaft rotatable in a first direction;
   a second shaft rotatable in a second direction, the second direction being generally opposite the first direction;
   a first propeller coupled to the first shaft for rotating the first shaft in the first direction;
   a second propeller coupled to the second shaft for rotating the second shaft in the second direction;
   an armature operatively coupled to the first shaft for rotation with the first shaft; and
   a field component operatively coupled to the second shaft for rotation with the second shaft;
   a collar extending from the second shaft;
   a flange plate extending from the second shaft;
   a bearing seated in the collar and supporting the first shaft; and
   a housing extending from the flange plate, the armature being inside the housing, the field component being embedded in or operatively coupled to the housing.

2. The turbine of claim 1, wherein the first shaft and the second shaft lie along and rotate about a common axis.

3. The turbine of claim 2, wherein the first shaft is generally cylindrical and rigid, and wherein the second shaft is generally cylindrical and rigid.

4. The turbine of claim 3, wherein the first propeller includes a plurality of blades radiating from a central hub, and wherein the second propeller includes a plurality of blades radiating from a central hub.

5. The turbine of claim 4, wherein the second propeller is larger than the first propeller.

6. The turbine of claim 5, wherein the flange plate extends from the second shaft at the collar.

7. The turbine of claim 6, wherein the housing is removably coupled to the flange plate, and further comprising a cover plate removably coupled to the housing.

8. The turbine of claim 1, wherein the first propeller is a forward propeller and the second propeller is a rear propeller, and wherein the first propeller rotates faster than the second propeller.

9. A turbine, further comprising:
   a first shaft rotatable in a first direction;
   a second shaft rotatable in a second direction, the second direction being generally opposite the first direction;
   a first propeller coupled to the first shaft for rotating the first shaft in the first direction;
   a second propeller coupled to the second shaft for rotating the second shaft in the second direction;
   an armature operatively coupled to the first shaft for rotation with the first shaft;
   a field component operatively coupled to the second shaft for rotation with the second shaft;
   a collar extending from the first shaft;
   a flange plate extending from the first shaft;
   a bearing seated in the collar and supporting the second shaft; and
   a housing extending from the flange plate, the field component being inside the housing, the armature being embedded in or operatively coupled to the housing.

10. The turbine of claim 9, wherein the first shaft and the second shaft lie along and rotate about a common axis.

11. The turbine of claim 9, wherein the first shaft is generally cylindrical and rigid, and wherein the second shaft is generally cylindrical and rigid.

12. The turbine of claim 11, wherein the first propeller includes a plurality of blades radiating from a central hub, and wherein the second propeller includes a plurality of blades radiating from a central hub.

13. The turbine of claim 12, wherein the second propeller is larger than the first propeller.

14. The turbine of claim 13, wherein the flange plate extends from the second shaft at the collar.

15. The turbine of claim 14, wherein the housing is removably coupled to the flange plate, and further comprising a cover plate removably coupled to the housing.

16. The turbine of claim 9, wherein the first propeller is a forward propeller and the second propeller is a rear propeller, and wherein the first propeller rotates faster than the second propeller.

17. A turbine for use in outputting electrical current, comprising:
   a first shaft rotatable in a first direction;
   a second shaft rotatable in a second direction, the second direction being generally opposite the first direction;
   means for rotating the first shaft in the first direction;
   means for rotating the second shaft in the second direction;
   an armature operatively coupled to the first shaft for rotation with the first shaft;
   a field component operatively coupled to the second shaft for rotation with the second shaft;
   a collar;
   a flange plate;
   a bearing seated in the collar; and
   a housing extending from the flange plate;
   wherein either:
   (a) the collar and the flange plate extend from the first shaft, the bearing supports the second shaft, the field component is inside the housing, and the armature is embedded in or operatively coupled to the housing; or
   (b) the collar and the flange plate extend from the second shaft, the bearing supports the first shaft, the armature is inside the housing, and the field component is embedded in or operatively coupled to the housing.

18. The turbine of claim 17, further comprising a plurality of bearings supporting the first and second shafts.

19. The turbine of claim 18, wherein the armature is inwardly adjacent the field component.

20. The turbine of claim 18, wherein the field component is inwardly adjacent the armature.

* * * * *

UNITED STATES PATENT AND TRADEMARK OFFICE
CERTIFICATE OF CORRECTION

| | |
|---|---|
| PATENT NO. | : 8,742,612 B1 |
| APPLICATION NO. | : 13/309433 |
| DATED | : June 3, 2014 |
| INVENTOR(S) | : Jon David Robbins et al. |

It is certified that error appears in the above-identified patent and that said Letters Patent is hereby corrected as shown below:

In the Claims

Claim 9 (column 4, line 5): delete the word "further".

Signed and Sealed this
Twenty-first Day of October, 2014

Michelle K. Lee
*Deputy Director of the United States Patent and Trademark Office*